W. E. GREENAWALT.
PROCESS OF EXTRACTING METALS FROM THEIR ORES.
APPLICATION FILED DEC. 10, 1907.
968,651.
Patented Aug. 30, 1910.
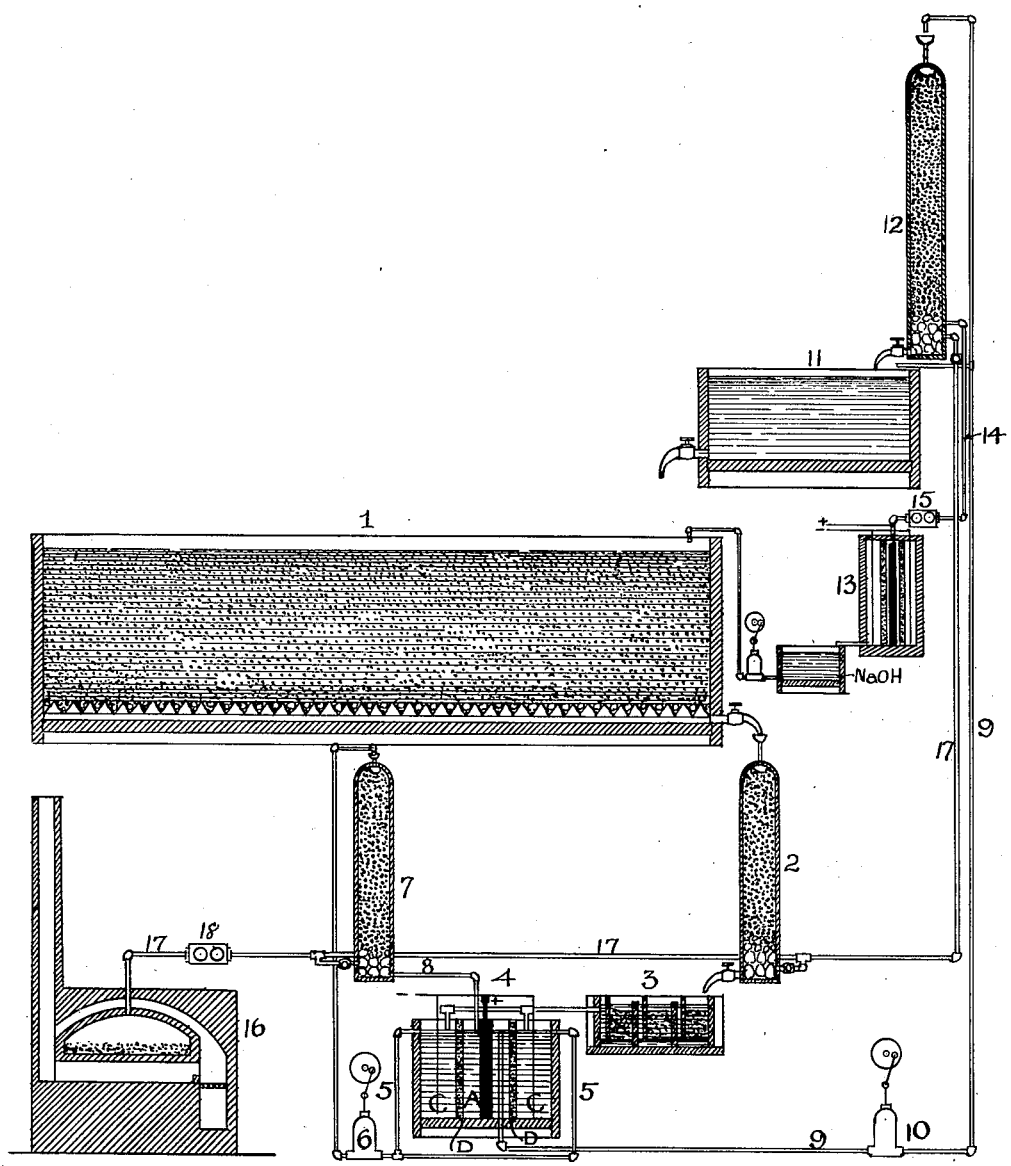
WITNESSES:
J. W. Gibbs
Geo. A. Pritchard
INVENTOR
William E. Greenawalt

UNITED STATES PATENT OFFICE.

WILLIAM E. GREENAWALT, OF DENVER, COLORADO.

PROCESS OF EXTRACTING METALS FROM THEIR ORES.

968,651.   Specification of Letters Patent.   Patented Aug. 30, 1910.

Application filed December 10, 1907. Serial No. 405,970.

*To all whom it may concern:*

Be it known that I, WILLIAM E. GREENAWALT, a citizen of the United States, residing in Denver, in the county of Denver and State of Colorado, have invented certain new and useful Improvements in Processes of Extracting Metals from Their Ores, of which the following is a specification.

My invention relates to improvements in processes of extracting metals from their ores.

It relates more particularly to copper ores and to ores containing copper with variable quantities of gold, silver, and other metals.

It relates more or less directly to the processes of extracting metals from their ores, as set forth in my applications for patents, April 20, 1905, Serial No. 256,667, and January 16, 1906, Serial No. 296,402.

Ores containing copper, with variable quantities of lead, nickel, etc., are also adapted to the process.

Copper ores almost always contain variable quantities of other metals, and these metals cannot be recovered by any one of the wet methods now in use. One, and sometimes two, additional treatments are necessary to extract the gold and silver occurring with the copper; and the lead is invariably lost.

The difficulty with acid processes has been, that the acid is usually too expensive to admit of extended use in mining districts, which are ordinarily located far from the source of acid supply. It takes approximately 1.5 pounds of sulfuric acid to dissolve one pound of copper. If hydrochloric acid is used, it takes approximately 0.6 pound of acid to extract one pound of copper as cuprous chlorid, and 1.1 pounds as cupric chlorid. Much of the acid, whether sulfuric or hydrochloric, combines with the base elements of the ore, and serves no useful purpose. When iron is used as the precipitant for the copper, it takes, theoretically, 88.8 pounds of iron to precipitate 100 pounds of copper from sulfate solutions. In practice it takes from 200 to 300 pounds. The fundamental difficulty, therefore, in treating copper ores by these methods, is in the excessive cost of the materials.

The object of my process is to reduce the cost of treatment, by the methods described in this specification.

In my electrolytic process, the copper in the ore is dissolved by dilute acid solutions of chlorids, and then precipitating the copper by electrolysis, from the chlorid solutions, while at the same time the acid, which was combined with the copper is regenerated and multiplied as free acid, at the expense of sulfur dioxid and water. The regenerated acid solution is returned to the ore until the copper is sufficiently extracted. Salt is the only chemical which it is necessary to provide, if the ore contains sulfur. Sulfur dioxid, usually derived from burning sulfur, or from roasting sulfid ore, is the active chemical consumed. Theoretically, the salt is not consumed, nevertheless, in practice, about one fourth pound of salt should be provided for every pound of copper produced.

In working the process, the ore is first crushed to about 12 mesh. Sulfid ore is roasted, but the carbonates, oxids, or silicates may be treated without roasting. If the ore is roasted, the salt may be added during the roasting. The ore is then placed in a leaching vat, or any other receptacle, for chemical treatment. The first step in the chemical process, consists in combining chlorin, preferably generated from common salt by electrolysis, with sulfur dioxid produced by roasting concentrates or sulfid ores, to generate acid. The reaction between the chlorin and sulfur dioxid, takes place readily in the presence of water, to form acid, and two atoms of copper may be extracted from the ore by applying the acid, while only one atom is possible when the chlorin is used direct. This may be shown by the following well known reactions:

(1) $2Cl+SO_2+2H_2O=H_2SO_4+2HCl$
(2) $H_2SO_4+CuO=CuSO_4+H_2O$
(3) $2HCl+CuO=CuCl_2+H_2O$
(4) $2Cl+CuO+H_2O=CuCl_2+H_2O+O$

Cupric chlorid, when warm and in the presence of other metal chlorids, acts readily on silver and its compounds to form silver chlorid, thus:

(5) $Ag+CuCl_2=AgCl+CuCl$

From 80% to 90% of the silver in the ore may in this way be extracted, even when the ore is given an oxidizing roast. If the ore contains considerable silver, it is desirable to leach with a fairly concentrated solution of metal chlorids. The chlorids of calcium and sodium are best adapted for this purpose.

An acid chlorid solution is capable of extracting the copper and silver from the ore. If however, the ore also contains gold, then in addition to the chlorid solution, it should contain free chlorin, since gold, of itself, is not soluble in a chlorid solution, but is readily soluble in a solution containing chlorin. The solubility of chlorin in water is limited. If a certain small amount is exceeded, the cheap handling of the ore and solution, in open vat leaching is rather difficult. By the indirect method of combining the chlorin with the sulfur dioxid, in the presence of water, to form acid, any desired strength of acid solution may be obtained for the copper, and a chlorin solution of sufficient strength for the gold.

The ore, after being placed in a leaching vat, or other receptacle, is treated with an acid chlorid solution. The dilute acid in the solution may consist of hydrochloric or sulfuric acid, or a combination of both. Usually, however, owing to the reaction of sulfuric acid with the chlorids, sulfates will be formed and hydrochloric acid set free, so that the solution will be largely, if not entirely, hydrochloric. All the base metal chlorids (and all may be in the solution), have the faculty of displacing copper from its sulfate combination. For example, if there is lime in the ore, as there usually is, either the sulfuric and hydrochloric acid may combine with it. If the sulfuric acid combines with it, the result will be the formation of sodium sulfate. If the hydrochloric acid combines with it, the result will be the formation of calcium chlorid; but the calcium chlorid will at once react with the copper sulfate in the solution, and convert it into the cupric chlorid, thus:—

(6) $CuSO_4 + CaCl_2 = CuCl_2 + CaSO_4$

The sodium chlorid reacts similarly, thus:—

(7) $CuSO_4 + 2NaCl = CuCl_2 + Na_2SO_4$

It is evident, therefore, that the sulfuric acid is the one which is eliminated by reacting with the base elements, and that the sulfuric acid resolves itself back to the sulfur dioxid from the roasting furnace. All of the base metal chlorids also act as a solvent for cuprous chlorid and of silver chlorid.

The acid chlorid solution, as applied to the ore, will issue from the vat, bearing the copper as cupric chlorid, although small quantities of cuprous chlorid may also be present. This solution may be passed directly through the electrolytic cell; but I much prefer to first bring it in contact with sulfur dioxid, which converts the cupric chlorid into the cuprous chlorid, thus:—

(8) 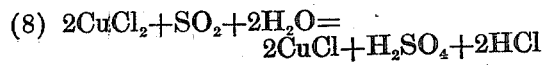
$2CuCl_2 + SO_2 + 2H_2O = 2CuCl + H_2SO_4 + 2HCl$

The object of this method of procedure is:

First: the electric current deposits twice as much copper per ampere from the cuprous as from the cupric solution, and with an expenditure of only 65% of the energy per unit of copper.

Second: the sulfur dioxid, combining with the cupric chlorid, produces large quantities of acid. A molecule of acid is in this way regenerated for every molecule of cupric chlorid reduced to cuprous chlorid. For every pound of copper reduced from the cupric to the cuprous condition, 1.4 pounds of acid is regenerated.

Third: if there is an excess of sulfur dioxid in the solution, the chlorin released by the electrolytic decomposition of the cuprous chlorid, combines with it, thereby again regenerating 1.4 pounds of acid for every pound of copper reduced from the cuprous condition to metallic copper. The reactions are:

(9) $2CuCl + \text{electric current} = 2Cu + 2Cl$
(10) $2Cl + SO_2 + H_2O = H_2SO_4 + 2HCl$ Fourth: insoluble anodes, precipitating copper from chlorid solutions, are vastly more durable than when precipitating from sulfate solutions.

Fifth: it is possible, in this way, to extract the other metals with the copper, and with the same solution, which is not possible when working on a sulfate basis.

It is evident, that in precipitating one pound of copper, in this way, by electrolysis, from chlorid solutions, 2.8 pounds of acid are regenerated at the expense of sulfur dioxid and water. This amount of acid is capable of taking up twice the amount of copper from which it was deposited.

The cupric chlorid solution, after being treated with sulfur dioxid to reduce it to the cuprous chlorid, is then passed through the negative, or cathode, compartment of an electrolytic cell, where the copper is deposited as metallic copper. The solution, issuing from the cathode compartment, and freed, or partially freed, from its copper, is then brought in contact with sulfur dioxid, and passed through the positive, or anode, compartment of the cell, when the reaction as shown in equation 10, takes place. If the ore contains only copper, the regenerated acid solution issuing from the anode compartment, is returned to the ore, where it takes up more copper, and the cycle is again repeated until the copper in the ore is sufficiently extracted. If the ore contains gold, in addition to the copper, the solution, after issuing from the anode compartment of the copper cells, is saturated with chlorin, preferably generated from common salt, by electrolysis.

It is desirable, at all times, to keep an excess of sulfur dioxid in the solution, as it passes through the anode compartment of the copper cells. In applying the sulfur dioxid, it is preferable to pass the solution, after it issues from the cathode compartment, through a scrubbing tower, where it is subdivided, while a current of sulfur dioxid is passing up through it. In this way a strong solution of sulfur dioxid is readily obtained with the greatest economy of sulfur. The circulation in the copper cells should be quite brisk, and may be supplemented by bubbling air through the solution. This air may contain sulfur dioxid.

In circulating the electrolyte, it is best to run the solution through the cathode compartments of a series of cells, then apply the sulfur dioxid, and return it through the anode compartments of the series. The details of the circulation are immaterial, so long as the essentials are complied with, and one of the essentials consists in first passing the copper solution through the cathode compartment, and then passing it through the anode compartment, while at the same time sufficient sulfur dioxid is present in the anode solution to combine with the chlorin, to form acid.

The copper solution, as it issues from the vat, may be passed directly through the cathode compartment of the cells, but in that case it will be necessary to provide twice the amount of sulfur dioxid in the anode compartment, and the process will not be as efficient or as easy of operation. It is immaterial, for the present purpose, whether the solution in the cathode compartment, has an excess of sulfur dioxid or not. It is preferable, however, to have all of the copper in the cuprous condition.

Much of the regenerated acid, in treating any ore, will combine with the base elements, and will not, therefore, be directly available for the extraction of the copper. The sulfuric acid is the one which is first eliminated by combining with the base elements, principally lime, forming the insoluble calcium sulfate, which remains in the ore, while the hydrochloric acid combines with the copper, again resulting in the formation of cupric chlorid. This cycle, of solution, precipitation, and regeneration, is repeated indefinitely. When one vat of ore is sufficiently treated, the solution is turned into the next. If there is gold in the ore, the acid chlorid solution is also charged with free chlorin. This chlorin is not lost in the operation of the process, but is ultimately converted into base metal chlorids and hydrochloric acid, in which form it is used to extract the copper and silver from new charges of ore. Theoretically, none of the chlorin, whether free or combined, is lost. It simply changes its condition from acid to chlorid in the leaching vats, and is again regenerated back to acid in the copper depositing cells.

Neither silver chlorid nor cuprous chlorid are appreciably soluble in water. Both, however, are readily soluble in chlorid solutions. It is desirable, therefore, to maintain a strong solution of base metal chlorids. By base metal chlorids is here meant any chlorids other than those of copper, gold and silver. If the solution did not contain these chlorids as a solvent for the cuprous chlorid, then when the sulfur dioxid were applied to the cupric chlorid solution as it issues from the leaching vats, the cuprous chlorid, which is not soluble in water, would be precipitated as a fine white powder, and one of the objects of the process would be defeated. Similarly, if the sulfur dioxid were applied to the solution after issuing from the cathode compartment, the cuprous chlorid would be precipitated from a water solution, because it is neither desirable nor practical to deposit all the copper in the cathode compartment, before allowing it to go to the anode compartment; so that in any event, the copper remaining in the solution while in the anode compartment will be in the form of cuprous chlorid, and will be retained in solution by the base metal chlorids. Since all copper ores contain variable quantities of silver, it is also necessary to maintain sufficient base metal chlorids in the solution to dissolve the silver chlorid formed at another stage of the process. If the ore contains only a small quantity of elements capable of combining with the acid, it may be necessary at times to neutralize the solution to prevent it from getting excessively acid. If the ore contains gold, this is best done by applying the caustic soda formed in the negative compartment of the chlorin cell, to the leaching solution, so that the equivalent of salt, from which the chlorin was generated, will be regenerated in the solution, as shown by the following general reaction:—

(11) 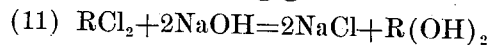

The precipitated hydroxids are then filtered from the solution. If the ore does not contain gold, so that the electrolysis of salt to generate chlorin is not necessary, then I prefer to use lime instead of the caustic soda. The use of lime will tend to throw the sulfates out of solution, and bring calcium chlorid into the solution. The presence of calcium chlorid is desirable, especially when the ore contains silver, as the solvent action of calcium chlorid on silver chlorid, is much greater than that of sodium chlorid.

When the ore contains a variety of metals, these may all be precipitated together with the copper, and afterward recovered from the anode slimes when the copper is electrolytically refined. However, if the ore contains much gold and silver, it is desirable to recover these separately. This may be done by passing the solution, after it issues from the leaching vat and before entering the cathode compartment of the copper cell, through a separate precipitating tank containing copper shavings or other finely divided copper. The copper will precipitate the gold and silver, while a corresponding amount of copper is taken into solution, which in turn is precipitated electrolytically in the copper cells. When the gold and silver have accumulated sufficiently in the gold and silver tank, they are washed free from the copper and melted into bullion; or the entire contents of the tank may be melted down into a copper bullion, and the separation of the metals effected electrolytically.

Having now explained the chemical reactions and general principles of the process, I will describe, in detail, a practical method of carrying it out.

Reference is made to the accompanying drawing representing a diagrammatic view of the apparatus, in which 1 is a leaching vat, 2 a scrubbing tower, through which the copper solution, issuing from the leaching vat, passes downwardly while a stream of sulfur dioxid passes upwardly, thus converting the cupric into the cuprous chlorid, according to equation 8. If it is not desired to reduce the cupric to the cuprous chlorid at this stage of the operation, the solution may be passed through the tower without the presence of sulfur dioxid. If the ore contains gold and silver in appreciable quantities, the solution is passed through the gold and silver precipitating tank, 3, which consists primarily of a tank filled with copper shavings or finely divided copper so arranged that the solution must take a circuitous path through the copper before it can emerge from the tank. It is well known that copper is a good precipitant of gold and silver. The gold and silver are precipitated, while a corresponding amount of copper goes into solution, and is in turn precipitated later on by the electric current in the copper cell, 4.

The solution, issuing from the precious metal precipitator, and having the copper preferably in the form of cuprous chlorid, is passed through the electrolytic cell, 4, in which C represents the cathode compartments, D, the diaphragm, and A the anode compartment. The solution first enters the cathode compartments, C, where the copper is electrolytically deposited, although it is neither necessary nor desirable to precipitate all of the copper out of the solution. The solution then leaves the cathode compartments through the pipes 5, and is elevated by means of a pump 6, to another scrubbing tower 7, in which it is again brought in contact with sulfur dioxid, and passed through the pipe 8, into the anode compartment of the electrolytic cell 4. While copper is being deposited from the cuprous chlorid solution in the cathode compartment, chlorin is released in the anode compartment, according to equation 9; but owing to the sulfur dioxid in the solution in the anode compartment, the chlorin immediately combines with it to form acid, according to equation 10. If the ore does not contain any gold, the regenerated acid solution, issuing from the anode compartment, through pipes, 9, is lifted by means of a pump 10, into a storage tank 11, and from there, again applied to the ore as desired. If the ore contains gold, it is elevated higher to the scrubbing tower 12, where the solution is subdivided and percolates down in the presence of chlorin gas, thereby forming a solution of free chlorin, which converts the gold in the ore into the soluble chlorid, and is in that way extracted.

The chlorin is generated from common salt, in the electrolytic cell 13; chlorin being given off in the anode compartment, while caustic soda is formed in the cathode compartment. The chlorin is conducted into the scrubbing tower 12, by means of the pipe 14, and a blower 15. The caustic soda may be used to neutralize the acidity of the solution should that be necessary or desirable. If the ore contains much lime or other injurious elements, so that the solution needs strengthening in acid, this is done by introducing sulfur dioxid with the chlorin in the scrubbing tower 12, and acid generated according to equation 1. The acid necessary to first start the process may also be made in this way.

The sulfur dioxid is generated in a muffle furnace 16, by roasting sulfid ores, and conducted by means of pipes 17, and the blower 18, to the various places of use as already described. Sulfur may be used to generate the sulfur dioxid, but will usually be found more expensive. If a large excess of sulfur dioxid is applied to the solution before entering the cathode compartment of the electrolytic cell, it may not be necessary, in some cases, to again apply the sulfur dioxid after issuing from the cathode compartment.

The current in the cell passes from anode to cathode, with a varying intensity, depending upon conditions. A current of 10 amperes per square foot gives good results.

The solution, issuing from the anode compartment of the copper precipitating cell 4, may still contain some free sulfur dioxid; in which case, the solution, instead of being applied again immediately to the copper ore in the leaching vat 1, through the storage tank 11, is first pumped to the top of the scrubbing tower 12, where it comes in contact with free chlorin, and the excess of sulfur dioxid in the solution is converted into acid, as set forth in equation 1.

Having thus described my invention, what

I claim and desire to secure by Letters Patent is:—

1. A process of extracting copper from its ores which consists in treating the ore with an acid chlorid solution to dissolve the copper; passing the chlorid solution containing the copper through the cathode compartment of an electrolytic cell to deposit the copper; applying sulfur dioxid to the solution after issuing from the cathode compartment; passing the solution through the anode compartment; returning the solution to the ore, and repeating the cycle as before, until the copper in the ore is sufficiently extracted.

2. A process of extracting copper from its ores which consists in treating the ore with an acid chlorid solution to dissolve the copper; applying sulfur dioxid to the resulting copper chlorid solution to convert the cupric chlorid into the cuprous chlorid; passing the cuprous chlorid solution through the cathode compartment of an electrolytic cell; applying sulfur dioxid to the solution after issuing from the cathode compartment; passing the solution through the anode compartment; returning the regenerated acid solution to the ore, and again repeating the cycle as before, until the copper in the ore is sufficiently extracted.

3. A process of extracting copper from its ores containing silver, which consists in treating the ore with an acid chlorid solution to dissolve the copper; applying sulfur dioxid to the resulting copper chlorid solution to convert the cupric into the cuprous chlorid; maintaining sufficient other chlorids in the solution to retain the cuprous chlorid in solution and to dissolve the silver chlorid formed in the ore; passing the cuprous chlorid solution through the cathode compartment of an electrolytic cell; again applying sulfur dioxid to the solution after issuing from the cathode compartment; passing the solution through the anode compartment; returning the solution to the ore, and again repeating the cycle as before, until the copper and silver in the ore are sufficiently extracted.

4. A process of extracting copper from its ores containing gold and silver, which consists in treating the ore with an acid chlorid solution to dissolve the copper and silver; applying sulfur dioxid to the resulting copper solution containing the silver, to convert the cupric chlorid into the cuprous chlorid; passing the cuprous chlorid solution through the cathode compartment of an electrolytic cell; applying sulfur dioxid to the solution after issuing from the cathode compartment; passing the solution containing sulfur dioxid through the anode compartment; applying free chlorin to the solution; then returning the solution to the ore, and again repeating the cycle until the copper, gold, and silver in the ore are sufficiently extracted.

5. A process of extracting copper from its ores containing gold and silver, which consists in treating the ore with an acid chlorid solution to dissolve the copper and silver; passing the chlorid solution containing the dissolved copper and silver through the cathode compartment of an electrolytic cell to deposit the copper and silver; applying sulfur dioxid to the solution after issuing from the cathode compartment; passing the solution through the anode compartment; applying chlorin to the solution to extract the gold; returning the solution to the ore, and repeating the cycle as before until the gold, silver, and copper are sufficiently extracted.

6. A process of extracting copper from its ores which consists in treating the ore with an acid chlorid solution to dissolve the copper; subdividing the resulting copper chlorid solution and applying sulfur dioxid to the subdivided solution to convert the cupric chlorid into the cuprous chlorid; passing the cuprous chlorid solution through the cathode compartment of an electrolytic cell; again subdividing the solution and bringing it in contact with sulfur dioxid; passing the solution through the anode compartment; returning the solution to the ore, and again repeating the cycle as before, until the copper in the ore is sufficiently extracted.

7. A process of extracting copper from its ores containing gold and silver which consists in treating the ore with an acid chlorid solution to dissolve the copper and silver; passing the resulting copper and silver chlorid solution through the cathode compartment of an electrolytic cell; subdividing the solution and bringing it in contact with sulfur dioxid; passing the solution through the anode compartment; again subdividing the solution and bringing it in contact with chlorin; then returning the solution to the ore, and again repeating the cycle as before, until the copper, gold, and silver are sufficiently extracted.

8. A process of extracting copper from its ores which consists in treating the ore with an acid chlorid solution, and then electrolyzing the resulting copper chlorid solution in the cathode compartment, while maintaining a solution of sulfur dioxid in the anode compartment.

9. A process of extracting copper from its ores which consists in treating the ore with an acid chlorid solution; applying sulfur dioxid to the resulting copper chlorid solution to convert the cupric chlorid into the cuprous chlorid; and then electrolyzing the cuprous chlorid in the cathode compartment while maintaining a solution of sulfur dioxid in the anode compartment.

10. A process of extracting copper from its ores which consists in treating the ore with an acid chlorid solution; applying sulfur dioxid to the resulting solution in excess of that required to convert the cupric chlorid into the cuprous chlorid; and then electrolyzing the cuprous chlorid, having an excess of sulfur dioxid, in the cathode compartment of an electrolytic cell, while maintaining a solution of sulfur dioxid in the anode compartment.

11. A process of extracting copper from its ores which consists in treating the ore with an acid chlorid solution; passing the resulting copper solution through the cathode compartment of an electrolytic cell; applying sulfur dioxid to the solution after issuing from the cathode compartment; and then electrolyzing this portion of the solution in the anode compartment while another portion of the solution from the ore is being electrolyzed in the cathode compartment.

12. A process of extracting copper from its ores which consists in treating the ore with an acid chlorid solution to dissolve the copper; applying sulfur dioxid in excess to the resulting copper chlorid solution; then passing the cuprous chlorid solution containing an excess of sulfur dioxid through the cathode compartment of an electrolytic cell; then through the anode compartment; returning the solution to the ore and repeating the cycle as before, until the copper in the ore is sufficiently extracted.

13. A process of extracting copper from its ores which consists in treating the ore with an acid chlorid solution; passing the copper chlorid solution through the cathode compartment of an electrolytic cell; applying sulfur dioxid to the solution after issuing from the cathode compartment; passing the solution through the anode compartment; neutralizing the excess of acid with lime; returning the solution to the ore and repeating the cycle as before, until the copper in the ore is sufficiently extracted.

14. A process of extracting copper from its ores which consists in treating the ore with an acid chlorid solution to dissolve the copper; passing the chlorid solution containing the copper through the cathode compartment of an electrolytic cell to deposit the copper; applying sulfur dioxid to the solution after issuing from the cathode compartment; passing the solution through the anode compartment; applying chlorin to the solution after issuing from the anode compartment to convert the excess of sulfur dioxid into acid; returning the solution to the ore, and repeating the cycle as before, until the copper in the ore is sufficiently extracted.

15. A process of extracting copper from its ores which consists in treating the ore with an acid chlorid solution to dissolve the copper; passing the chlorid solution containing the copper through the cathode compartment of an electrolytic cell; passing the solution after issuing from the cathode compartment through the anode compartment and electrolyzing it in the presence of sulfur dioxid; applying chlorin to the solution after issuing from the anode compartment to convert the excess of sulfur dioxid into acid; returning the solution to the ore and repeating the cycle as before until the copper in the ore is sufficiently extracted.

16. A process of extracting copper from its ores which consists in treating the ore with an acid chlorid solution to dissolve the copper; passing the chlorid solution containing the copper through the cathode compartment of an electrolytic cell; passing the solution after issuing from the cathode compartment, through the anode compartment and electrolyzing it in the presence of sulfur dioxid; electrolyzing an alkali metal chlorid to generate chlorin and caustic alkali; applying the chlorin so generated to a portion of the copper solution to convert the excess of sulfur dioxid into acid; applying the caustic alkali to another portion of the copper solution to neutralize the acid and precipitate the base elements from the solution; applying the purified and regenerated acid solution to the ore to dissolve more copper, and repeating the cycle, as before, until the copper in the ore is sufficiently extracted.

WILLIAM E. GREENAWALT.

Witnesses:
HUBERT S. SEWELL,
JESSIE SELLERS.